(12) United States Patent
Levy et al.

(10) Patent No.: US 7,493,088 B2
(45) Date of Patent: Feb. 17, 2009

(54) METHOD AND SYSTEM FOR PROVIDING INFORMATION ABOUT A COMMUNICATIONS DEVICE

(75) Inventors: Rami C. Levy, Plantation, FL (US); Mark A. Barros, Wellington, FL (US); Robert C. Gray, Deerfield Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 11 days.

(21) Appl. No.: 10/733,616

(22) Filed: Dec. 11, 2003

(65) Prior Publication Data

US 2005/0130666 A1  Jun. 16, 2005

(51) Int. Cl.
*H04B 17/00* (2006.01)

(52) U.S. Cl. .................. 455/67.11; 455/67.14; 455/513; 455/456.1; 455/63.1

(58) Field of Classification Search .................. 455/423, 455/452.1
See application file for complete search history.

(56) References Cited

U.S. PATENT DOCUMENTS 5,859,839 A * 1/1999 Ahlenius et al. ............ 370/252
2002/0123309 A1* 9/2002 Collier et al. .............. 455/67.1
2003/0013456 A1* 1/2003 Bates et al. ................. 455/456
2003/0022671 A1* 1/2003 Huomo et al. .............. 455/436
2003/0231753 A1* 12/2003 Casaccia ................ 379/207.02
2004/0097224 A1* 5/2004 Lim .......................... 455/425
2005/0054352 A1* 3/2005 Karaizman ............... 455/456.3

* cited by examiner

*Primary Examiner*—Charles N. Appiah
*Assistant Examiner*—Fred Casca
(74) *Attorney, Agent, or Firm*—Larry G. Brown

(57) ABSTRACT

The invention concerns a method (300) of providing information about a communications device. The method includes the steps of establishing (312) a communications connection between a first mobile communications unit (128) and at least a second mobile communications unit (130), transmitting (314) from the first mobile communications unit to the second mobile communications unit a condition of at least one operational parameter of the first mobile communications unit and informing (316) a user of the second mobile communications unit of the conditions of the operational parameters of the first mobile communications unit. The operational parameters of the first mobile communications unit can include a signal strength, a battery level, a location, an audio configuration, an alert configuration, a conference indicator and a phone type indicator.

22 Claims, 3 Drawing Sheets ns, a battery level, a location, an audio configuration, an alert configuration, a conference indicator or a phone type indicator. Additionally, the transmitting step can include the step of selectively transmitting from the first mobile communications unit to the second mobile communications unit the

METHOD AND SYSTEM FOR PROVIDING INFORMATION ABOUT A COMMUNICATIONS DEVICE

CROSS REFERENCE TO RELATED APPLICATIONS (Not Applicable)

BACKGROUND

1. Technical Field

This invention relates in general to communications systems and more particularly to information exchange in such systems.

2. Description of the Related Art

Portable communications units have become ubiquitous in today's society. In particular, millions of individuals communicate with one another through the use of cellular telephones and the communications networks that support such devices. Although the quality of these communications has made tremendous strides, problems remain. For example, battery life is a major problem with cellular telephones, as the mobile unit will shut down once the battery voltage drops to a certain level. Moreover, as a caller moves through and away from a cell, there is a chance that the mobile unit will lose contact with the base station because of the attenuation of the base station signal or because of some other technical problem. As a result, many phone calls are lost or dropped.

These lost calls are inconvenient to the call participants. As an example, the telephone for a first caller may lose contact with a base station just as a second caller is beginning a lengthy description of directions or some other instructive. The second caller, as he is unaware of the loss of signal strength, may talk for an extended amount of time before realizing that the first caller is no longer connected. Such an incident may also occur if the battery voltage for the battery of the first caller's telephone drops below the minimum amount of voltage required for operation and the first caller's telephone shuts off.

SUMMARY OF THE INVENTION

The present invention concerns a method of providing information about a communications device. The method includes the steps of establishing a communications connection between a first mobile communications unit and at least a second mobile communications unit, transmitting from the first mobile communications unit to the second mobile communications unit a condition of at least one operational parameter of the first mobile communications unit and informing a user of the second mobile communications unit of the conditions of the operational parameters of the first mobile communications unit. The method can further include the steps of transmitting from the second mobile communications unit to the first mobile communications unit a condition of at least one operational parameter of the second mobile communications unit and informing a user of the first mobile communications unit of the conditions of the operational parameters of the second mobile communications unit.

In one arrangement, the operational parameters of the first mobile communications unit can be a signal strength, a battery level, a location, an audio configuration, an alert configuration, a conference indicator or a phone type indicator. Additionally, the transmitting step can include the step of selectively transmitting from the first mobile communications unit to the second mobile communications unit the conditions of the operational parameters of the first mobile communications unit such that the conditions of only selected operational parameters of the first mobile communications unit are transmitted to the second mobile communications unit. Moreover, the establishing step can include the step of establishing the communications connection between the first mobile communications unit, the second mobile communications unit and a network. The network can select the operational parameters whose condition is transmitted to the second mobile communications unit. In another arrangement, the first mobile communications unit can select the operational parameters whose condition is transmitted to the second mobile communications unit.

The informing step can include the step of informing the user of the second mobile communications unit of the conditions of the operational parameters of the first mobile communications unit by at least one of displaying at least one icon, broadcasting at least one audio tone and causing the second mobile communications unit to vibrate. The icons, audio tones and vibrations can correspond to the transmitted conditions of the operational parameters of the first mobile communications unit. In one arrangement, the icons, the audio tones and the vibrations can be distinguishable from any second icons, audio tones and vibrations that are used to display, broadcast and inform a user of a condition of operational parameters of the second mobile communications unit.

In yet another arrangement, the conditions of the operational parameters can be transmitted over a control channel. The conditions of the operational parameters can also be transmitted at periodic intervals and only if the conditions of the operational parameters have changed from a previous transmission. The method also includes the step of modifying the conditions of the operational parameters to enable the second mobile communications unit to process the conditions of the operational parameters.

The present invention also concerns a system for providing information about a communications device. The system can include a first mobile communications unit having at least one operational parameter and a second mobile communications unit in which a communications connection is established between the first and second mobile communications units. In addition, at least one condition of the operational parameters of the first mobile communications unit is transmitted from the first mobile communications unit to the second mobile communications unit. The second mobile communications unit has a user interface for informing a user of the second mobile communications unit of the conditions of the operational parameters of the first mobile communications unit. The system also includes suitable software and circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
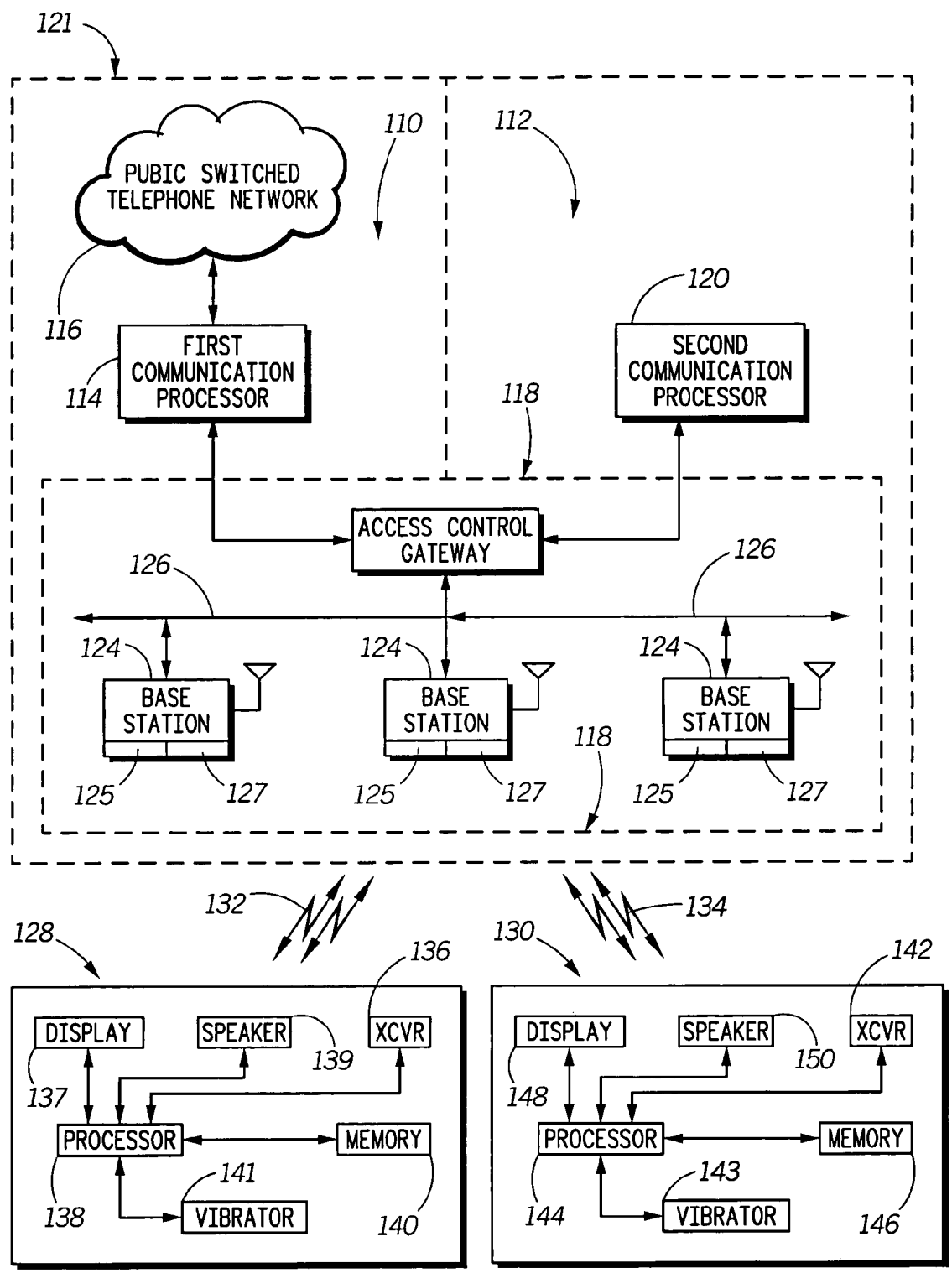
FIG. 1 illustrates a system for exchanging information about remote conditions in accordance with the inventive arrangements.

While the specification concludes with claims defining the features of the invention that are regarded as novel, it is believed that the invention will be better understood from a consideration of the following description in conjunction with the drawing figures, in which like reference numerals are carried forward.

Referring to FIG. 1, a system 100 for providing information about a communications device is shown. As an example and without limitation, the system 100 can include both a cellular telephone services portion 110 for supporting cellular telephone services and a trunked dispatch services portion 112 for supporting trunked dispatch services. To support the cellular telephone services, the cellular telephone services portion 110 can include a first communications processor 114, which can be coupled to the public switched telephone network (PSTN) 116 and at least one site 118. The site 118 can include infrastructure that supports wireless communications.

To support the dispatch services, the dispatch services portion 112 can include a second communications processor 120, which can also be coupled to the site 118. As such, both the first communications processor 114 and the second communications processor 120 can share the infrastructure of the site 118 for processing both the cellular telephone and dispatch services. Although such a shared configuration is efficient, it is not necessary for the operation of either of these services. In addition, it is understood that the cellular telephone services portion 110 and the trunked dispatch services portion 112 can be coupled to sites other than or in addition to the site 118 and the PSTN 116. All or portions of the first communications processor 114, the PSTN 116, the site 118 and the second communications processor 120 can be considered a communications network 121.

In one arrangement, the site 118 can include one or more access control gateways 122 and one or more base stations 124 coupled to the access control gateway 122 through a bus 126. The base stations 124 can communicate with, for example, a first mobile communications unit 128 over a wireless communications link 132 and with, as another example, a second mobile communications unit 130 over another wireless communications link 134. The first mobile communications unit 128 can also be referred to as the first mobile unit 128, and the second mobile communications unit 130 can be referred to as the second mobile unit 130. For purposes of the invention, the term mobile communications unit or mobile unit can be any portable device suitable for receiving communications signals.

The access control gateway 122 can include a computational platform having computational capacity and storage sufficient to support the functions described below. In addition, the link between the access control gateway 122 and the first communications processor 114 can be any high-level data link, as defined by the International Standards Organization. In one arrangement, the link between the access control gateway 122 and the second communications processor 120 can be a frame relay link. It is understood, however, that the invention is not limited in this regard, as any other suitable link can be used between the access control gateway 122 and the first communications processor 114 and the second communications processor 120.

The base stations 124 can include radio transceivers configured to receive and transmit on appropriate frequencies using suitable modulation and air interface protocols for supporting the requirements of the services being provided. The base stations 124 can also include a processor 125 and a memory 127 (which may or may not be part of the processor 125). These two components can work together to selectively permit the transfer of information between, for example, the first mobile unit 128 and the second mobile unit 130, a process that will be described later. In another arrangement, the bus 126 that couples the base stations 124 to the access control gateway 122 can be an Ethernet link, as well understood in the art.

The operation and configuration of the cellular telephone services portion 110 and the dispatch services portion 112 are well known, and an in-depth discussion is not warranted. Briefly, however, the first communications processor 114 can include a mobile switching center (not shown), a telephone database (not shown) and a base site controller (not shown). As appreciated by those of skill in the art, the mobile switching center can interface with the PSTN 116 and the base site controller. The mobile switching center can also control the provision of cellular telephone service to, for example, the first mobile unit 128 and the second mobile unit 130, if the first mobile unit 128 and the second mobile unit 130 support such a service. The telephone database can be coupled to the mobile switching center and can provide to the mobile switching center information concerning the operation of communications units, such as the first mobile unit 128 and the second mobile unit 130. The base site controller can contain the memory and logic circuits necessary to administer and monitor the routing of interconnect calls through the cellular telephone services portion 110.

Additionally, the second communications processor 120 can include a dispatch application processor (DAP) (not shown), a metropolitan packet switch (not shown) and a dispatch database (not shown). The DAP can be programmed to allocate communication resources among dispatch service users, and the metropolitan packet switch can route the paths that voice or data packets will use in the dispatch services portion 112. The dispatch database can include information regarding current dispatch operability states of communications units that are served by the dispatch services portion 112. Examples include individual identification, group identification, alias information, roaming status and priority information.

The first mobile unit 128 can include a transceiver 136, a processor 138 and a memory 140. The first mobile unit 128 can also include a display 137 for displaying images, including icons, a speaker 139 for broadcasting audio and a vibrator motor 141 for generating vibrations. Similarly, the second mobile unit 130 can include a transceiver 142, a processor 144, a memory 146, a display 148, a speaker 150 and a vibrator motor 143.

Figure 2:
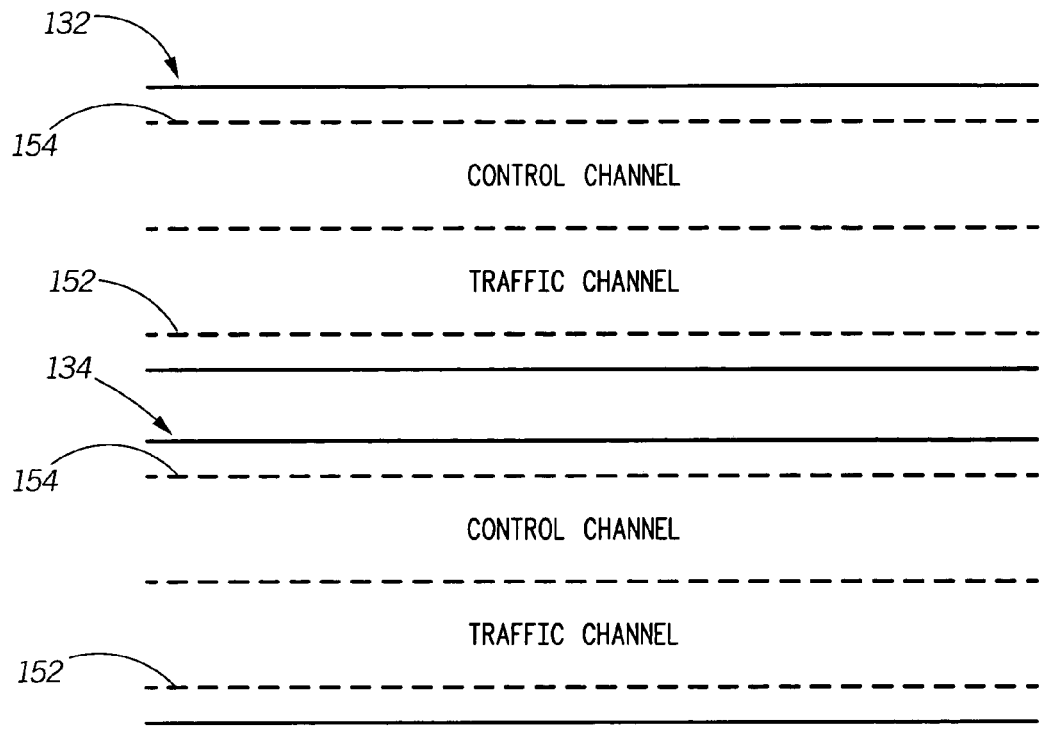
FIG. 2 illustrates a wireless communications link in accordance with the inventive arrangements.

Referring to FIGS. 1 and 2, the first mobile unit 128 and the second mobile unit 130 can transmit and receive signals through their transceivers 136 and 142, respectively, over the wireless communications links 132 and 134, respectively. The wireless communications links 132, 134 can include a traffic channel 152, which can carry voice and data signals, and a control channel 154, which can carry, for example, network information, as is understood by those of ordinary skill in the art.

In accordance with the inventive arrangements, information about the first mobile unit 128 can be transmitted from the first mobile unit 128 to the second mobile unit 130 through either the cellular telephone services portion 110 or the dispatch services portion 112. Additionally, information about the second mobile unit 130 can be transmitted from the second mobile unit 130 to the first mobile unit 128 through the portions 110 and 112. In one arrangement, the information can include the status or condition of operational parameters of the first and second mobile units 128, 130 and can be transmitted over the control channel 154. An operational parameter can be any information that provides a measurement or an indication of any settings, configurations or conditions of a mobile communications unit. The communications unit that transmits information to another communications unit can be referred to as a transmission unit; the communications unit that receives information from another communications unit can be referred to as a receiving unit.

Figure 3:
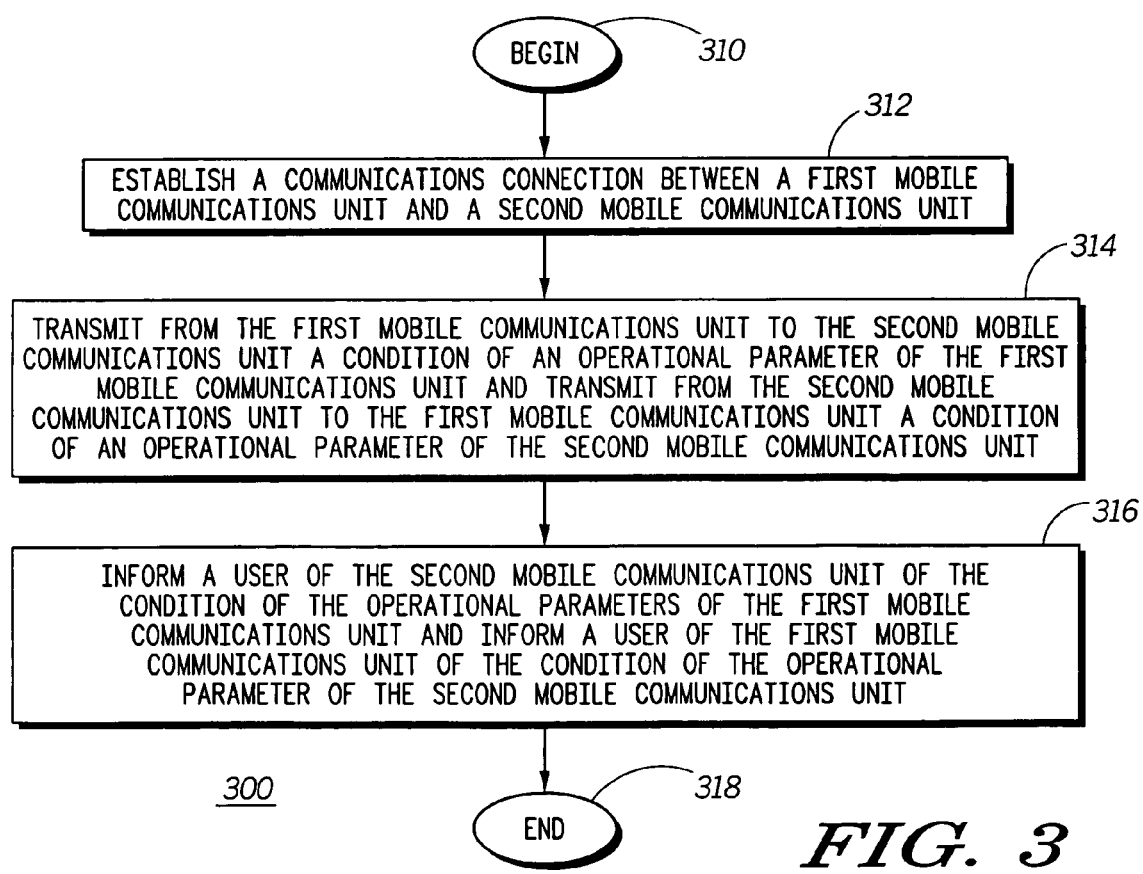
FIG. 3 illustrates a method of providing information about a communications device in accordance with the inventive arrangements.

Referring to FIG. 3, a method 300 for providing information about a communications device is shown. For explanative purposes only, reference will be made to the system 100 of FIG. 1 when describing the method 300. It must be noted, however, that the method 300 can be practiced in any other suitable system. The method 300 can begin at step 310, and at step 312, a communications connection between a first mobile communications unit and a second mobile communications unit can be established. This connection can be between the two communications units or between the two communications units and a communications network. For example, referring to FIG. 1, a user of the first mobile unit 128 can place a call to a user of the second mobile unit 130. The call can be carried over the wireless communications links 132, 134 and can be an interconnect call over the cellular telephone services portion 110 or a dispatch call over the dispatch services portion 112. Of course, this connection is not limited to this example, as the connection can be between any number of communications units using any suitable communications link(s).

Referring back to the method 300 of FIG. 3, at step 314, a condition of one or more operational parameters of the first mobile communications unit can be transmitted from the first mobile communications unit to the second mobile communications unit. Likewise and as also shown in step 314, a condition of one or more operational parameters of the second mobile communications units can be transmitted from the second mobile communications unit to the first mobile communications unit. Referring back to FIGS. 1 and 2, an example of this process will be described.

After the communications connection has been established, the condition of one or more operational parameters of the first mobile unit 128 can be transmitted from the first mobile unit 128 to the second mobile unit 130. This data can be transmitted over the wireless communications link 132 and can be transferred over the cellular telephone services portion 110 or the dispatch services portion 112. The data can then be transmitted to the second mobile unit 130 over the wireless communications link 134. As an example and as noted earlier, the data concerning the conditions of the operational parameters can be transmitted over the control channel 154 of the wireless communications links 132, 134. The conditions of operational parameters of the second mobile unit 130 can be transmitted to the first mobile unit 128 in a similar manner.

In one arrangement, the operational parameters can be the current signal strength, a battery level, a location, an audio configuration, an alert configuration, a conference indicator and a phone type indicator. The processor 138 of the first mobile unit 128 and the processor 144 of the second mobile unit 130 can be programmed to monitor these operational parameters and to receive and process the conditions of the operational parameters of any other communications unit. For descriptive purposes, these operational parameters will be described in relation to the first mobile unit 128, although one or more of them may apply to the second mobile unit 130 or any other suitable communications device to be used to practice the invention.

The current signal strength can be, for example, a measurement of the strength of the signal that the first mobile unit 128 is currently receiving from the relevant base station 124. The battery level can be an indication of the amount of charge left on the battery of the first mobile unit 128. In addition, the location parameter can be information concerning the physical whereabouts of the first mobile unit 128. Examples include global positioning system coordinates or enhanced observed time difference (EOTD) data. The audio configuration can be information that indicates whether the user of the first mobile unit 128 has enacted an audio setting that will cause audio to be channeled to a particular speaker, e.g., a speakerphone setting. As another example, the audio configuration can be a volume setting.

The alert configuration can be data that specifies the selected setting of the first mobile unit 128 for informing the user of the first mobile unit 128 that a call is incoming. For example, the user may have set an alert for informing him of incoming calls to a ring mode, a vibrate mode or a silent mode, in which no indication is given. The conference indicator can be information that indicates whether the user of the first mobile unit 128 has arranged a conference call in which more than two callers are participating or will participate in the call. More specifically, the conference indicator can identify the actual number of participants in the conference call. The phone type indicator can identify the type of telephone that a caller is using, such as whether the caller is using a wireless phone or a landline phone. It is understood, however, that this listing of operational parameters is not exhaustive, as any other suitable operational parameter is within contemplation of the inventive arrangements. Moreover, the operational parameters may have less than all of the parameters listed above.

Figure 4:
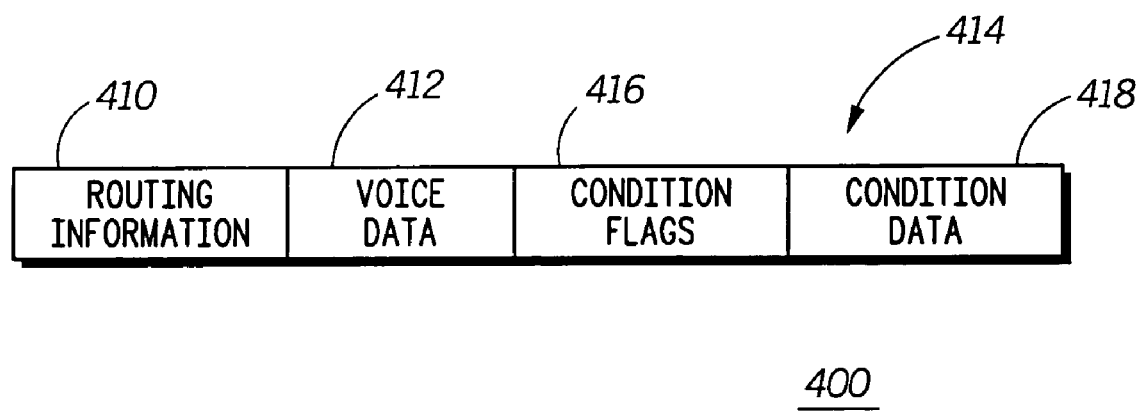
FIG. 4 illustrates an example of a transmission protocol in accordance with the inventive arrangements.

As noted above, the conditions of the operational parameters can be transmitted over a control channel 154 (see FIG. 2). Referring to FIG. 4, an example of a transmission protocol 400 for the conditions of the operational parameters is shown. At least a portion of the transmission protocol 400 can include a routing information block 410, a voice data information block 412 and a condition block 414, which can comprise one or more condition flags 416 and one or more corresponding condition data blocks 418. The routing information 410 can include data concerning the routing of a particular call and the voice data information block 412 can include settings about the voice data being transmitted over the voice channel (such as the traffic channel 152 of FIG. 2).

The condition flags 416 can signal whether a particular operational parameter of a communications device, such as the first mobile unit 128, is enabled or disabled. The condition data blocks 418 can include the actual data that is to be processed for an enabled operational parameter. If an operational parameter is enabled, then the data concerning the condition of that operational parameter will be transmitted to another communications device, such as the second mobile unit 130, and processed. Conversely, the data concerning the condition of a disabled operational parameter will not be processed and may not even be transmitted from the originating communications device.

Referring back to FIG. 1 and step 314 of FIG. 3, in one arrangement, the conditions of the operational parameters can be selectively transmitted between the first mobile unit 128 and the second mobile unit 130. For example, a user of the first mobile unit 128 can select which of the conditions of the operational parameters will be transmitted to or received from the second mobile unit 130. The user of the first mobile unit 128 can make these selections through a menu on the display 137 of the first mobile unit 128 or through any other suitable interface, such as a Web site.

As an example, the user of the first mobile unit 128 may not wish for the conditions of certain operational parameters of his first mobile unit 128 to be transmitted to a user of the second mobile unit 130, such as the location of the first mobile unit 128. This selection can be made through the appropriate interface. Additionally, the user of the first mobile unit 128 may not wish to receive the conditions of one or more of the operational parameters of the second mobile unit 130. Accordingly, the user of the first mobile unit 128 can make a selection through the appropriate interface to block the receipt of such operational parameters from the second mobile unit 130. The user of the second mobile unit 130 can make similar selections in accordance with the description above.

The selections that are made in reference to the selective transmission of the conditions of operating parameters can be stored in any suitable device. For example, if a user enters selections in the first mobile unit 128, these selections can be stored in the memory 140. These selections can also be transmitted to a component of the communications network 121, such as a base station 124, where they can be stored in the memory 127.

If the selections are stored in the memory 140, the processor 138 of the first mobile unit 128 can access these selections when the conditions of the operational parameters are to be transmitted to the second mobile unit 130. The processor 138 can be programmed to block the transmission of the conditions of any operational parameters that the user does not wish to have transmitted. Likewise, the processor 125 of the base station 124 can conduct a similar process by accessing the memory 127 if such selections are stored there. In addition, the above description applies to the second mobile unit 130. Also, any other suitable component of the communications network 121 can be used to perform this operation.

When the first mobile unit 128 receives the conditions of operational parameters from the second mobile unit 130, for example, the processor 138 can also access selections from the memory 140 and can prevent these conditions from being presented to the user of the first mobile unit 128. In another arrangement, when the data concerning the operational parameters is received at the base station 124, the processor 125 can access the selections from the memory 127 and can block this data from being transmitted to the first mobile unit 128. In either arrangement, this filtering process can override any enabled condition flags (see FIG. 4). Of course, the description above also applies to the second mobile unit 130 in which that unit 130 blocks the receipt of the conditions of operational parameters from the first mobile unit 128. Any other suitable component of the communications network 121 can also carry out this process of blocking received operational parameter conditions.

In another arrangement, the conditions of the operational parameters can be transmitted at periodic intervals and only if the conditions of the operational parameters have changed from a previous transmission. For example, the processor 138 of the first mobile unit 128 can be programmed to cause the transmission of the conditions of the operational parameters in accordance with a predetermined time interval. Moreover, the processor 138 can be programmed to cause this periodic transmission only if the conditions of the operational parameters have changed since the last time the conditions were transmitted.

As a more specific example, the processor 138 can cause the condition of the battery level to be transmitted to the second mobile unit 130 at a predetermined time. At the next scheduled interval, if the battery level of the first mobile unit has dropped from a charge of 50% to a charge of 25% (or some other predetermined setting) since the last transmission, the processor 138 can cause the condition of the modified battery level to be transmitted to the second mobile unit. Conversely, if the battery level has not changed at the time of the next scheduled interval, the processor 138 will not cause this unchanged condition to be transmitted to the second mobile unit 130. It is understood that this feature applies to all the operational parameters, and the second mobile unit 130 can perform a similar process. Moreover, the processor 125 of the base station 124, or any other suitable component of the communications network, can cause the periodic and selective transmission of the operational parameter conditions in accordance with the description above.

It is also important to note that the periodic transmission is not limited to a time interval. For example, the conditions of the operational parameters can be transmitted when the conditions change and not necessarily based on a predetermined time interval. For example, if the battery level of the first mobile unit 128 drops to a lower level, the processor 138 of the first mobile unit 128 can cause this updated condition to be transmitted immediately to the second mobile unit 130, regardless of whether it is time for a transmission to occur based on a predetermined time interval.

In another arrangement, data, i.e., the conditions of the operating parameters, that is being transmitted from the transmitting unit may be modified to enable the receiving unit to process the information. The processor 125 of the base station 124 (or any other suitable component of the communications network 121) can perform this data modification. For example, if the first mobile unit 128 relies on EOTD technology to determine its location and the second mobile unit 130 employs GPS to establish its position, the processor 125 of the base station 124 can convert the EOTD data to a form that the processor 144 of the second mobile unit 130 recognizes. This modification of data feature can apply to any suitable type of information that is being exchanged by two communications units.

Referring back to the method 300 of FIG. 3, at step 316, the user of the second mobile communications unit can be informed of the conditions of the operational parameters of the first mobile communications unit. Further, the user of the first mobile communications unit can be informed of the conditions of the operational parameters of the second mobile communications unit. That is, the user of a receiving unit can be informed of the signal strength, the battery level, the location, the audio configuration and the alert configuration of the transmitting unit. Moreover, the user of the receiving unit can be informed that the user of the transmitting unit is engaged in or is attempting to engage in a conference call and whether the transmitting unit is a wireless unit or a hardwired unit.

The users of these units can be informed of these conditions through any suitable interface. For example, referring back to FIG. 1, the conditions can be displayed as icons on the display 137 of the first mobile unit 128 or the display 148 of the second mobile unit 130. As another example, these conditions can be broadcast as audio tones over the speakers 139, 150 of the first and second mobile units 128, 130, respectively. One or more vibrations generated from the vibrator motor 143 of the second mobile unit 130 can inform a user of the second mobile unit 130 of the conditions of the first mobile unit 128. For example, a series of vibrations can inform the user of a low battery level or loss of signal strength of the first mobile unit 128.

The displayed icons, broadcast audio tones and vibrations that correspond to the transmitted conditions of the operational parameters can be distinguishable from other icons, audio tones or vibrations. For example, any icons that correspond to the transmitted operational parameter conditions of the first mobile unit 128 and that are displayed on the display 148 or broadcast through the speaker 150 of the second mobile unit 130 can be distinguishable from the icons and/or audio tones that are displayed or broadcast to inform a user of the operational conditions of the second mobile unit 130. This principle can also apply to any vibrations that correspond to the transmitted operational parameter conditions of the first mobile unit 128. This differentiation can assist the user of the second mobile unit 130 in distinguishing measurements of operational parameters of the second mobile unit 130 from those of the transmitted conditions of the first mobile unit 128 and vice-versa.

The icons of the transmitted conditions can be displayed on the displays 137, 148 in a different color from that of the icons that represent the operating conditions of the receiving unit. Additionally, the icons of the transmitted conditions can include patterns that differ from the patterns of the receiving unit icons. Similarly, the audio tones that correspond to the transmitted conditions can have a different pitch from the audio tones that are used to inform a user of the operating conditions of the receiving unit. The audio tones that correspond to the transmitted conditions can also be broadcast in accordance with a different arrangement, such as a musical score, from that of the audio tones used to inform a user of the status of any parameters of the receiving unit. In one arrangement, the vibrations that correspond to the transmitted conditions can be generated by the vibrator motor at cycles that are higher or lower than the cycles for the vibrations that are normally used to indicate conditions for the receiving unit.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of providing information about a communications device, comprising the steps of:
    establishing a communications connection between a first mobile communications unit and at least a second mobile communications unit; and
    once the communications connection has been established and during the established communications connection, periodically transmitting from the first mobile communications unit to the second mobile communications unit a condition of at least one operational parameter of the first mobile communications unit, wherein the condition of the operational parameter provides an indication as to the ability of the first mobile communications unit to maintain the communications connection with the second mobile communications unit to periodically inform a user of the second mobile communications unit of the conditions of the operational parameters of the first mobile communications unit, wherein said informing step comprises the step of informing the user of the second mobile communications unit of the conditions of the operational parameters of the first mobile communications unit by at least one of displaying at least one icon, broadcasting at least one audio tone and causing the second mobile communications unit to vibrate, wherein the icons, audio tones and vibrations correspond to the transmitted conditions of the operational parameters of the first mobile communications unit.

2. The method according to claim 1, further comprising the steps of:
    transmitting from the second mobile communications unit to the first mobile communications unit a condition of at least one operational parameter of the second mobile communications unit to inform a user of the first mobile communications unit of the conditions of the operational parameters of the second mobile communications unit.

3. The method according to claim 1, wherein the operational parameters of the first mobile communications unit are a signal strength, a battery level, a location, an audio configuration, an alert configuration, a conference indicator or a phone type indicator.

4. The method according to claim 1, wherein said transmitting step comprises the step of selectively transmitting from the first mobile communications unit to the second mobile communications unit the conditions of the operational parameters of the first mobile communications unit such that the conditions of only selected operational parameters of the first mobile communications unit are transmitted to the second mobile communications unit.

5. The method according to claim 4, wherein said establishing step comprises the step of establishing the communications connection between the first mobile communications unit, the second mobile communications unit and a network, wherein the network selects the operational parameters whose condition is transmitted to the second mobile communications unit.

6. The method according to claim 4, wherein the first mobile communications unit selects the operational parameters whose condition is transmitted to the second mobile communications unit.

7. The method according to claim 1, wherein the icons, the audio tones and the vibrations are distinguishable from any second icons, audio tones and vibrations that are used to display, broadcast and inform a user of a condition of operational parameters of the second mobile communications unit.

8. The method according to claim 1, wherein the conditions of the operational parameters are transmitted over a control channel.

9. The method according to claim 1, wherein the conditions of the operational parameters are transmitted at periodic intervals and only if the conditions of the operational parameters have changed from a previous transmission.

10. The method of claim 1, further comprising the step of modifying the conditions of the operational parameters to enable the second mobile communications unit to process the conditions of the operational parameters.

11. A system for providing information about a communications device, comprising:
    a first mobile communications unit having at least one operational parameter; and
    a second mobile communications unit, wherein a communications connection is established between the first and second mobile communications units and once the communications connection is established and during the established communications connection, at least one condition of the operational parameters of the first mobile communications unit is periodically transmitted from the first mobile communications unit to the second mobile communications unit, wherein the condition of the operational parameter provides an indication as to the ability of the first mobile communications unit to maintain the communications connection with the second mobile communications unit, wherein the second mobile communications unit has a user interface for periodically informing a user of the second mobile communications unit of the conditions of the operational parameters of the first mobile communications unit, wherein the user interface is a speaker, a display or a vibrator motor, wherein the second mobile communications unit informs the user of the second mobile communications unit of the conditions of the operational parameters of the first mobile communications unit by displaying at least one icon on the display, by broadcasting on the speaker at least one audio tone or by generating a vibration through the vibrator motor, wherein the icons, the audio tones and the vibrations correspond to the transmitted conditions of the operational parameters of the first mobile communications unit.

12. The system according to claim 11, wherein the first mobile communications unit has a user interface and the second mobile communications unit has at least one operational parameter, wherein a condition of the operational parameters of the second mobile communications unit is transmitted from the second mobile communications unit to the first mobile communications unit, wherein the first mobile communications unit through the first mobile communications unit user interface informs a user of the first mobile communications unit of the conditions of the second mobile communications unit.

13. The system according to claim 11, wherein the operational parameters of the first mobile communications unit are a signal strength, a battery level, a location, an audio configuration, an alert configuration, a conference indicator or a phone type indicator.

14. The system according to claim 11, wherein the conditions of the operational parameters of the first mobile communications unit are selectively transmitted from the first mobile communications unit to the second mobile communications unit such that the conditions of only selected operational parameters of the first mobile communications unit are transmitted to the second mobile communications unit.

15. The system according to claim 14, further comprising a communications network, wherein the communication network selects the operational parameters whose condition is transmitted to the second mobile communications unit.

16. The system according to claim 14, wherein the first mobile communications unit has a processor programmed to select the operational parameters whose condition is transmitted to the second mobile communications unit.

17. The system according to claim 11, wherein the icons, the audio tones and the vibrations are distinguishable from any second icons, audio tones and vibrations that are used to display, broadcast and inform a user of a condition of operational parameters of the second mobile communications unit.

18. The system according to claim 11, wherein the conditions of the operational parameters are transmitted over a control channel.

19. The system according to claim 11, wherein the conditions of the operational parameters are transmitted at periodic intervals and only if the conditions of the operational parameters have changed from a previous transmission.

20. The system according to claim 11, wherein the conditions of the operational parameters are modified to enable the second mobile communications unit to process the conditions of the operational parameters.

21. A method of providing information about a communications device, comprising the steps of:
    establishing a communications connection between a first mobile communications unit and at least a second mobile communications unit; and
    once the communications connection has been established and during the established communications connection, periodically transmitting from the first mobile communications unit to the second mobile communications unit a condition of at least one operational parameter of the first mobile communications unit to inform a user of the second mobile communications unit of the conditions of the operational parameters of the first mobile communications unit,
    wherein the condition of the operational parameter provides an indication as to the ability of the first mobile communications unit to maintain the communications connection with the second mobile communications unit to periodically inform a user of the second mobile communications unit of the conditions of the operational parameters of the first mobile communications unit,
    wherein said informing step comprises the step of informing the user of the second mobile communications unit of the conditions of the operational parameters of the first mobile communications unit by at least one of displaying at least one icon, broadcasting at least one audio tone and causing the second mobile communications unit to vibrate, wherein the icons, audio tones and vibrations correspond to the transmitted conditions of the operational parameters of the first mobile communications unit.

22. The method according to claim 21, wherein the operational parameters are operational settings, including an audio configuration, an alert configuration, a conference indicator or a phone type indicator.

* * * * *